(12) United States Patent
Kamijima

(10) Patent No.: US 7,184,188 B2
(45) Date of Patent: Feb. 27, 2007

(54) SPATIAL LIGHT MODULATOR AND IMAGE DISPLAY DEVICE

(75) Inventor: Shunji Kamijima, Hana-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/253,556

(22) Filed: Oct. 20, 2005

(65) Prior Publication Data

US 2006/0176540 A1 Aug. 10, 2006

(30) Foreign Application Priority Data

Feb. 7, 2005 (JP) ............................. 2005-030118

(51) Int. Cl.
*G02B 26/00* (2006.01)
*G02B 27/10* (2006.01)

(52) U.S. Cl. ...................... 359/237; 359/625

(58) Field of Classification Search ................ 359/237, 359/242, 245, 246, 251, 272, 275, 290, 291, 359/292, 293, 220, 222, 223, 224, 320, 431, 359/438, 496, 514, 625, 638; 345/75.2, 211, 345/212

See application file for complete search history.

(56) References Cited

U.S. PATENT DOCUMENTS 5,151,801 A 9/1992 Hiroshima 6,700,554 B2 * 3/2004 Ham et al. .................. 345/75.2
7,113,341 B2 * 9/2006 Kamijima .................... 359/619

FOREIGN PATENT DOCUMENTS

| JP | A-2004-070282 | 3/2004 |
| JP | A-2004-347692 | 12/2004 |

* cited by examiner

*Primary Examiner*—Ricky Mack
*Assistant Examiner*—Tuyen Tra
(74) *Attorney, Agent, or Firm*—Oliff & Berridge, PLC

(57) ABSTRACT

A spatial light modulator includes a modulator for modulating incident light in accordance with an image signal, and an optical path deflector that is provided in the neighborhood of the modulator and reflects the incident light to the modulator, wherein the modulator includes plural pixel portions arranged in a matrix form and a light shielding portion provided between the pixel portions, and the optical path deflector is a prism element having a reflection portion for reflecting the incident light to the pixel portions, the prism element being disposed at a position corresponding to the light shielding portion on a reference face, and the length of the prism element in a direction substantially perpendicular to the reference face being set in the range from 15 times to 250 times of the length of the prism element in a direction substantially parallel to the reference face.

8 Claims, 16 Drawing Sheets

STEP a

STEP b

STEP c

FIG. 20-A
STEP a
STEP b
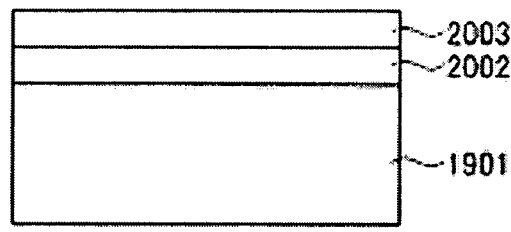
STEP c
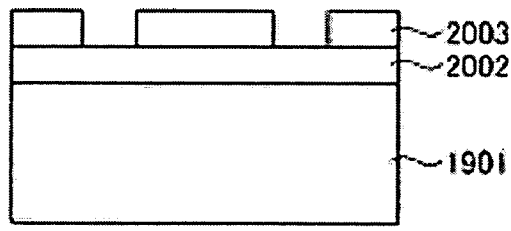
STEP d
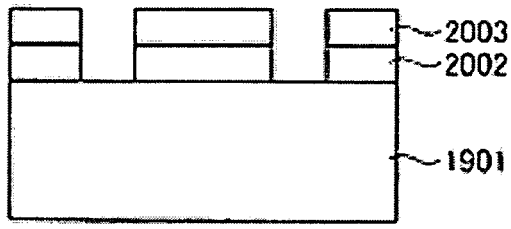

FIG. 20-B
STEP e
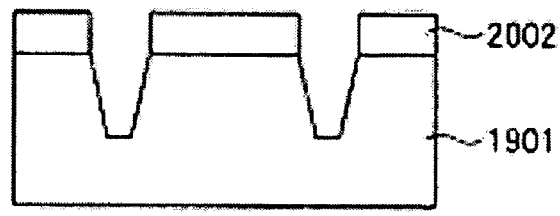
STEP f
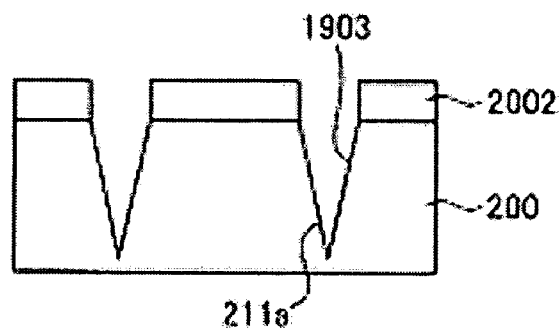
STEP g
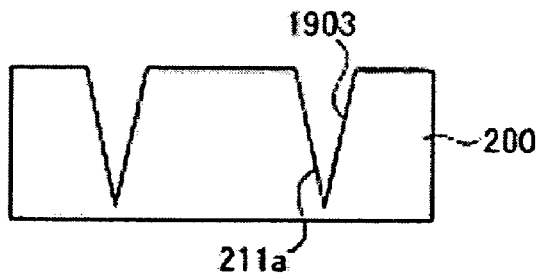

FIG. 21-A
STEP a
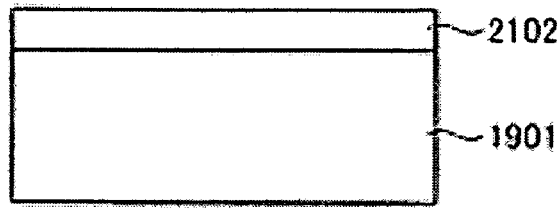
STEP b
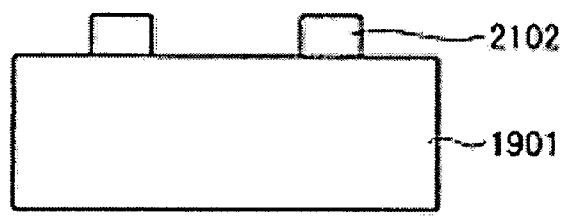
STEP c
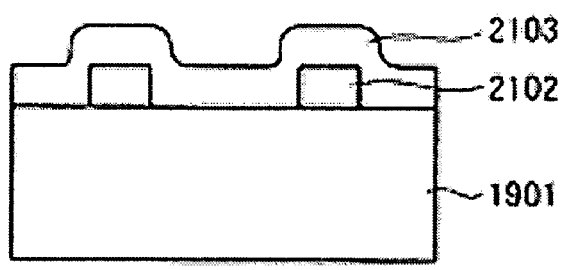
STEP d
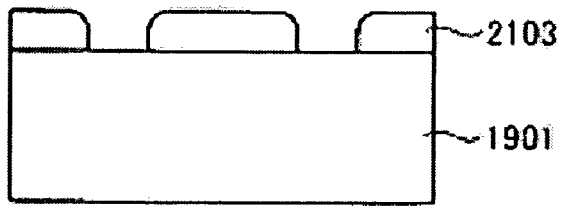

FIG. 21-B
STEP e
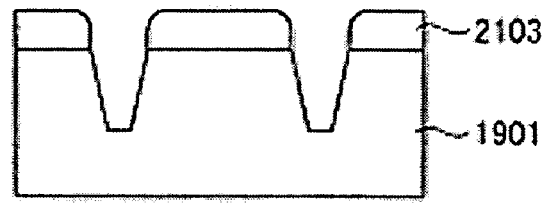
STEP f
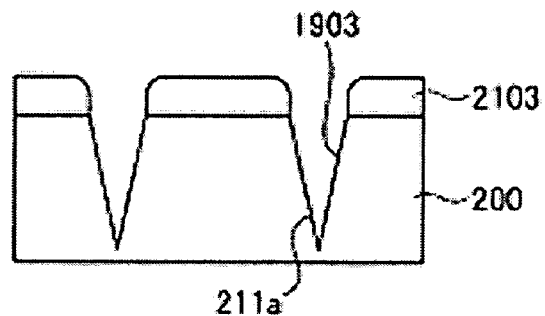
STEP g
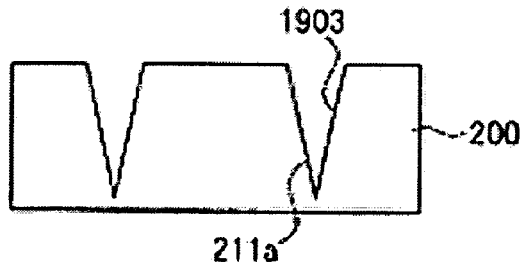

SPATIAL LIGHT MODULATOR AND IMAGE DISPLAY DEVICE

BACKGROUND

1. Technical Field

The presents invention relates to a spatial light modulator and an image display device, and particularly to a liquid crystal type spatial light modulator.

2. Related Art

A spatial light modulator, particularly a liquid crystal type spatial light modulator is equipped with various kinds of wires such as data lines, scan lines, capacitance lines, etc. and various kinds of electric elements such as thin film transistors (hereinafter referred to TFT (Thin Film Transistor)), thin film diodes, etc. in an image display area. Therefore, in each area, an area where light actually-contributing to display is transmitted or reflected (i.e., an opening area of each pixel) is limited by existence of various kinds of wires, electric elements, etc. in each pixel. Here, the aperture ratio of each pixel is defined as the rate of the aperture area (in which light actually-contributing to display is transmitted or reflected) to the overall area of each pixel. The aperture ratio of each pixel is set equal to about 70%, for example. For example, light incident from a light source portion to a spatial light modulator is substantially collimated light, and the light amount corresponding to the aperture ratio of each pixel out of the overall light amount of light incident to the spatial light modulator is effectively modulated.

Therefore, a microlens array having a plurality of microlenses each of which corresponds to each pixel is formed on a counter substrate. The microlens has a function of condensing light traveling to a non-opening area on a pixel basis. Here, the non-opening area is an area which is located around an opening area and where wires, etc. as described above exist. Light condensed by each microlens is guided into the opening area of each pixel while transmitted through a liquid crystal layer of the spatial light modulator.

For example, Japanese Patent Application Publication 2004-70282 (JP-A-2004-70282) has proposed that a microlens array is applied to a spatial light modulator.

Most of light incident to a microlens is emitted from the microlens with the intersecting angle (light beam angle) between the light beam and the optical axis being kept large by the condensing action of the microlens. The liquid crystal layer of the spatial light modulator can display an image with higher contrast as light having a smaller light beam angle is incident to the liquid crystal layer. Therefore, when the amount of light having a large light beam angle is increased, the contrast of the image is lowered. Furthermore, a projection optical system transmits therethrough only light having the incident angle corresponding to a numerical aperture thereof (hereinafter referred to as "NA"). As described above, in the spatial light modulator using the microlens array, light is condensed to the opening area at a predetermined NA by each microlense. The light incident to the opening area is modulated in accordance with an image signal in the liquid crystal portion, for example, and then the light thus modulated is emitted from the liquid crystal portion at a predetermined NA which is substantially equal to that for the incident light.

With respect to the light emitted from the spatial light modulator, the light beam angle between the optical axis and the light beam refracted by the condensing action of the microlens is increased. Light having a light beam angle larger than NA of the projection optical system is shut off by the projection optical system. If the amount of light having a light beam angle larger than NA of the projection optical system is large, a large amount of light is shut off by the projection optical system, and thus the light using efficiency is lowered. With respect to the spatial light modulator using the microlens array, as described above, even when light from the light source portion is efficiently guided to the opening area, the amount of light having a large light beam angle is increased, so that the contrast is lowered and the light using efficiency is lowered.

SUMMARY

An advantage of the present invention is to provide a spatial light modulator that can provide high contrast and efficiently use incident light, and an image display device which can display a bright image with high contrast.

According to a first aspect of the invention, there is provided a spatial light modulator comprising: a modulator for modulating incident light in accordance with an image signal, and a optical path deflector that is provided in the neighborhood of the modulator and reflects the incident light to the modulator, wherein the modulator includes plural pixel portions arranged in a matrix form and a light shielding portion provided between the pixel portions, and the optical path deflector is a prism element having a reflection portion for reflecting the incident light to the image pixel portions, the prism element being disposed at a position corresponding to the light shielding portion on a reference face, and the length of the prism element in a direction substantially perpendicular to the reference face being set in the range from 15 times to 250 times of the length of the prism element in a direction substantially parallel to the reference face.

In the spatial light modulator described above, light is incident at various incident angles from a light source portion for supplying light to the modulator. Light which is directly incident to the modulator travels in a light traveling direction with no change, and modulated in the modulator. On the other hand, light which is incident to a non-modulation area provided around the modulator is incident to a prism element provided around the modulator. The light incident to the prism element is reflected to the modulator, and thus light traveling in a direction different from the direction to the modulator can be made incident to the modulator.

According to the construction of the spatial light modulator described in connection with the related art, all the light incident to the modulator is transmitted through the microlens. Therefore, all the light incident to the modulator suffers a refractive action of the microlens except for light traveling on the optical axis. As a result, in the spatial light modulator described in connection with the related art, all the light emitted from the spatial light modulator has any light beam angle corresponding to NA of the microlens for condensed light. Accordingly, light having a light beam angle larger than NA of the projection optical system is shut off by the projection optical system. On the other hand, according to the construction of the first aspect of the invention, light which is incident to the modulator without passing through the prism element is directly incident to the modulator. Therefore, for example when substantially collimated light is incident to the modulator, modulated light is also emitted while substantially collimated. The prism element has no refraction-based condensing function, and thus the light beam angle at which the light passing through the prism element and the optical axis intersect to each other is hardly increased.

Furthermore, in the case of use of a prism element in which the length of the prism element in a direction substantially perpendicular to the reference face ranges from 15 times to 250 times of the length of the prism element in a direction substantially parallel to the reference face, light is reflected by a reflection portion, whereby incident light can be deflected with suppressing increase of the light beam angle. Accordingly, increase of the light beam angle can be also suppressed for light which has been subjected to optical path deflection in the prism element. According to the spatial light modulator, reduction of the contrast can be suppressed by suppressing occurrence of light having a large light beam angle. Furthermore, for example, light shut off by the projection optical system can be reduced, and the incident light can be efficiently used. Accordingly, there can be achieved a spatial light modulator that can provide high contrast and efficiently use incident light.

Furthermore, it is preferable that the length of the prism element in the direction substantially perpendicular to the reference face ranges from 20 times to 200 times of the length in the direction substantially parallel to the reference face. In the case of use of a prism element in which the length of the prism element in the direction substantially perpendicular to the reference face ranges from 20 times to 200 times of the length of the prism element in the direction substantially parallel to the reference face, light is reflected by the reflection portion, whereby incident light can be deflected with suppressing increase of the light beam angle. Accordingly, increase of the light beam angle can be further suppressed for light which has been subjected to optical path deflection in the prism element.

It is preferable that the reflection portion has a first area and a second area disposed to be located at a shorter distance from the pixel portion than the first area, and the first area and the second area are provided so that the intersecting angle between the normal line of the reference face and the second area is larger than the intersecting angle between the normal line of the reference face and the first area. When the inclination of the first area is equal to the inclination of the second area, light reflected from the second area is incident to a farther position from the center portion of the opening portion than light reflected from the first area. In many cases, the orientation state of liquid crystal is more unstable at the peripheral portion of the opening portion than at the center portion of the opening portion by an effect of electrodes provided to an adjacent pixel portion. Accordingly, it is difficult to achieve high contrast with light incident to the peripheral portion of the opening portion. In this case, by making the intersection angle between the normal line of the reference face and the second area larger than the intersecting angle between the normal line of the reference face and the first area, the light reflected from the second area can be made incident to a position near to the center portion of the opening portion as in the case of the light reflected from the first area, whereby the contrast can be further enhanced.

Furthermore, it is preferable that the reflection portion contains an effective reflection area that intersects to the normal line of the reference face at an intersecting angle of 3 degrees or less. By forming the effective reflection area, light reflected by the reflection portion can be deflected while increase of the light beam angle is suppressed. Furthermore, by forming the effective reflection area, incident light can be converted to light having a light beam angle that can be sufficiently taken by a projection optical system having f-number of 2.5, for example. Accordingly, the contrast can be enhanced, and the incident light can be efficiently used.

Still furthermore, it is preferable that the reflection portion is provided so that the effective reflection area thereof occupies 70% or more of the overall area of the reflection portion, whereby the contrast can be enhanced and the effective use of incident light can be implemented.

Still furthermore, it is preferable that the light shielding portion has a first light shielding portion whose longitudinal direction is coincident with a first direction substantially parallel to the reference face, and a second light shielding portion whose longitudinal direction is coincident with a second direction that is substantially parallel to the reference face and substantially perpendicular to the first direction, the first light shielding portion and the second light shielding portion are arranged so as to intersect each other at a cross portion, and the width in a direction substantially perpendicular to the longitudinal direction is set to be larger at the cross portion as compared with that at the other portions than the cross portion. By forming the first light shielding portion and the second light shielding portion so that the width at the cross portion is larger than the width at the other portions than the cross portion, electrical parts that have been required to be disposed at the lower side of the other portions than the cross portion in the related art can be disposed at the lower side of the cross portion. If the electrical parts are shifted from the other portions than the cross portion to the cross portion, the first light shielding portion and the second light shielding portion can be designed such that the width at the other portions than the cross portion is reduced as compared to conventional one. Accordingly, a large opening portion can be formed while keeping the accommodating space for the electrical parts. If a larger opening portion can be provided as compared with the spatial light modulator described in connection with the related art, a larger amount of light can be made incident to the opening portion as compared to conventional one. Furthermore, by providing a larger opening portion, a large amount of light traveling straightly along the optical axis can be made incident to the opening portion. Still furthermore, a large amount of light can be made incident to the vicinity of the center portion at which the orientation state of liquid crystal is stable. Therefore, the contrast can be enhanced, and the incident light can be efficiently used.

Still furthermore, according to a second aspect of the invention, there is provided an image display device comprising a light source portion for supplying light, a spatial light modulator for modulating the light from the light source portion in accordance with an image signal, and a projection optical system for projecting the light modulated by the spatial light modulator, wherein the spatial light modulator includes a modulator for modulating incident light in accordance with an image signal, and a optical path deflector that is provided in the neighborhood of the modulator and reflects the incident light to the modulator, wherein the modulator includes plural pixel portions arranged in a matrix form and a light shielding portion provided between the pixel portions, and the optical path deflector is a prism element having a reflection portion for reflecting the incident light to the image pixel portions, the prism element being disposed at a position corresponding to the light shielding portion on a reference face, and the length of the prism element in a direction substantially perpendicular to the reference face being set in the range from 15 times to 250 times of the length of the prism element in a direction substantially parallel to the reference face. The image display device of the second aspect of the invention has the spatial light modulator described above. High contrast can be provided and incident light can be efficiently used by using the spatial light modulator described above. Accordingly, there can be achieved an image display device that can display a bright image with high contrast.

It is preferable that when the f-number of the projection optical system is represented by F, the spatial light modulator emits incident light intersecting to the normal line of the reference face at a predetermined angle while converting the incident light to light having an angle θo satisfying the following equation (1):

$$0 \leq \theta o \leq \arctan\{1/(2F)\} \quad (1)$$

A projection optical system whose f-number is equal to F can take light having a light beam angle θo satisfying the equation (1). For example, light having a predetermined light beam angle that has the highest existence probability in the incident light is converted to light having a light beam angle θo satisfying the equation (1), whereby the light modulated by the spatial light modulator can be efficiently projected by the projection optical system. Accordingly, the incident light can be efficiently projected, and a bright image can be displayed.

BRIEF DESCRIPTION OF THE DRAWINGS

The present invention will be described with reference to the accompanying drawings, wherein like numbers reference like elements.

FIG. 20A is a diagram showing a process of forming a prism element by dry etching.

FIG. 20B is a diagram showing a subsequent process of forming the prism element by dry etching.

FIG. 21A is a diagram showing a process of forming a prism element by dry etching.

FIG. 21B is a diagram showing a subsequent process of forming the prism element by dry etching.

DESCRIPTION OF EXEMPLARY EMBODIMENTS

Preferred embodiments according to the present invention will be described hereunder with reference to the accompanying drawings.

First Embodiment

Figure 1:
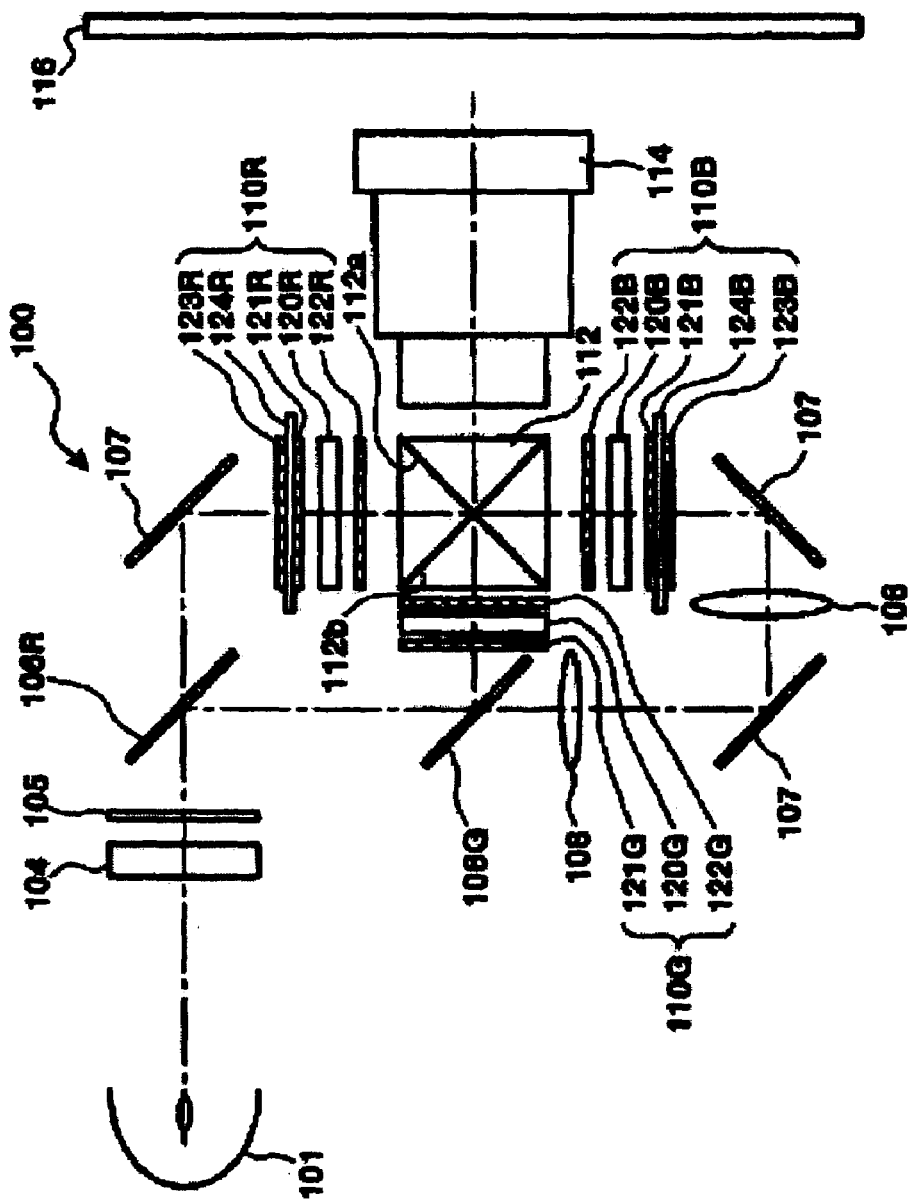
FIG. 1 is a diagram showing the schematic construction of a projector according to a first embodiment of the invention.

FIG. 1 is a diagram showing the schematic construction of a projector 100 as an image display device according to a first embodiment of the invention. A light source portion 101 is a superhigh pressure mercury lamp for supplying light containing red color light as first color light (hereinafter referred to as "R light"), green color light as second color light (hereinafter referred to as "G light") and blue color light as third color light (hereinafter referred to as "B light"). An integrator 104 uniformizes an illumination distribution of light from the light source portion 101. Light whose illumination distribution is made uniform is converted to polarized light having a specific vibration direction, that is, s-polarized light in a polarized light converting element 105. The light converted to the s-polarized light is incident to an R light transmissible dichroic mirror 106R constituting a color separating optical system.

The R light transmissible dichroic mirror 106R transmits the R light therethrough, and also reflects both the G light and the B light therefrom. The R light transmitted through the R light transmissible dichroic mirror 106R is incident to a reflection mirror 107. The reflection mirror 107 bends the optical path of the R light by 90 degrees. The R light whose optical path is bent is incident to a first color light spatial light modulator 110R for modulating the R light as the first color light in accordance with an image signal. The first color light spatial light modulator 110R is a transmission type liquid crystal display device for modulating R light in accordance with an image signal. Even when light is transmitted through the dichroic mirror, the polarization direction of the light is not varied, so that the R light incident to the first color light spatial light modulator 110R is kept to be s-polarized light with no change.

The first color light spatial light modulator 110R has a λ/2 phase difference plate 123R, a glass plate 124R, a first polarizing plate 121R, a liquid crystal panel 120R and a second polarizing plate 122R. The detailed construction of the liquid crystal panel 120R will be described later. The λ/2 phase difference plate 123R and the first polarizing plate 121R are arranged in contact with the light-transmissible glass plate 124R which does not convert the polarization direction. Accordingly, a problem that the first polarizing plate 121R and the λ/2 phase difference plate 123R are distorted by heating can be avoided. In FIG. 1, the second polarizing plate 122R is independently provided, however, it may be disposed in contact with the light emission face of the liquid crystal panel 120R or the incident face of the cross dichroic prism 112.

The s-polarized light incident to the first color light spatial light modulator 110R is converted to p-polarized light by the λ/2 phase difference plate 123R. The R light thus converted to the p-polarized light is transmitted through the glass plate 124R and the first polarizing plate 121R with no change, and then incident to the liquid crystal panel 120R. The p-polarized light incident to the liquid crystal panel 120R is modulated in accordance with an image signal, so that the R light is converted to s-polarized light. The R light which is converted to the s-polarized light by the modulation in the liquid crystal panel 120R is emitted from the second polarizing plate 122R. As described above, the R light modulated by the first color light spatial light modulator 110R is incident to the cross dichroic prism 112 serving as a color composition optical system.

The optical paths of the G light and the B light reflected from the R light transmissible dichroic mirror 106R are bent by 90 degrees. The G light and the B light whose optical paths are bent are incident to a B light transmissible dichroic mirror 106G. The B light transmissible dichroic mirror 106G reflects G light therefrom and transmits B light therethrough. The G light reflected from the B light transmissible dichroic mirror 106G is incident to a second color light spatial light modulator 110G for modulating the G light as the second color light in accordance with an image signal. The second color light spatial light modulator 110G is a transmissible type liquid crystal display device for modulating G light in accordance with an image signal. The second color light spatial light modulator 110G has a liquid crystal panel 120G, a first polarizing plate 121G and a second polarizing plate 122G. The details of the liquid crystal panel 120G will be described later.

The G light which is about to be incident to the second color light spatial light modulator 110G is converted to s-polarized light. The s-polarized light incident to the second color light spatial light modulator 110G is transmitted through the first polarizing plate 121G with no change, and incident to the liquid crystal panel 120G. The s-polarized light incident to the liquid crystal panel 120G is modulated in accordance with an image signal, so that the G light is converted to p-polarized light. The G light which has been converted to the p-polarized light by the modulation of the liquid crystal panel 120G is emitted from the second polarizing plate 122G. As described above, the G light modulated by the second color light spatial light modulator 110G is incident to a cross dichroic prism 112 as a color composition optical system.

The B light transmitted through the B light transmissible dichroic mirror 106G is passed through two relay lenses 108 and two reflection mirrors 107 and then incident to a third color light spatial light modulator 110B for modulating B light as third color light in accordance with an image signal. The third color light spatial light modulator 110B is a transmission type liquid crystal display device for modulating B light in accordance with an image signal. The B light is passed through the relay lenses 108 because the length of the optical path of the B light is longer than the length of the optical paths of the R light and the G light. By using the relay lenses 108, the B light transmitted through the B light transmissible dichroic mirror 106G can be guided to the third color light spatial light modulator 110B with no change. The third color light spatial light modulator 110B has a λ/2 phase difference plate 123B, a glass plate 124B, a first polarizing plate 121B, a liquid crystal panel 120B and a second polarizing plate 122B. The construction of the third color light spatial light modulator 110B is the same as the construction of the first color light spatial light modulator 110R described above, and the detailed description thereof is omitted.

The B light incident to the third color light spatial light modulator 110B has been converted to s-polarized light. The s-polarized light incident to the third color light spatial light modulator 110B is converted to p-polarized light by the λ/2 phase difference plate 123B. The B light thus converted to the p-polarized light is passed through the glass plate 124B and the first polarizing plate 121B without change, and then incident to the liquid crystal panel 120B. The p-polarized light incident to the liquid crystal panel 120B is subjected to modulation based on the image signal, so that the B light is converted to s-polarized light. The B light which has been converted to the s-polarized light by the modulation in the liquid crystal panel 120B is emitted from the second polarizing plate 122B. The B light modulated by the third color light spatial light modulator 110B is incident to a cross dichroic prism 112 serving as a color composition optical system. As described above, the R light transmissible dichroic mirror 106R and the B light transmissible dichroic mirror 106G which constitute a color separating optical system separate light supplied from the light source portion 101 into the R light as the first color light, the G light as the second color light and the B light as the third color light.

The cross dichroic prism 112 as the color composition optical system is constructed by arranging two dichroic films 112a, 112b so that the dichroic films 112a and 112b are orthogonal to each other in X-shape. The dichroic film 112a reflects the B light therefrom, and transmits the G light therethrough. The dichroic film 112b reflects the R light therefrom, and transmits the G light therethrough. As described above, the cross dichroic prism 112 combines the R light, the G light and the B light which are modulated by the first color light spatial light modulator 110R, the second color light spatial light modulator 110G and the third color light spatial light modulator 110B, respectively. The projection optical system 114 projects the light thus combined in the cross dichroic prism 112 to a screen 116, whereby a full color image can be achieved on the screen 116.

As described above, the light incident from the first color light spatial light modulator 110R and the third color light spatial light modulator 110B to the cross dichroic prism 112 is set to be s-polarized light. The light incident from the second color light spatial light modulator 110G to the cross dichroic prism 112 is set to be p-polarized light. As described above, by making the polarization directions of light beams incident to the cross dichroic prism 112 different, light beams emitted from the respective color light spatial light modulators can be effectively combined with one another in the cross dichroic prism 112. The dichroic films 112a and 112b normally have an excellent reflection characteristic of s-polarized light. Therefore, the R light and the B light reflected from the dichroic films 112a, 112b are set to s-polarized light, and the G light transmitted through the dichroic films 112a and 112b is set to p-polarized light.

Figure 2:
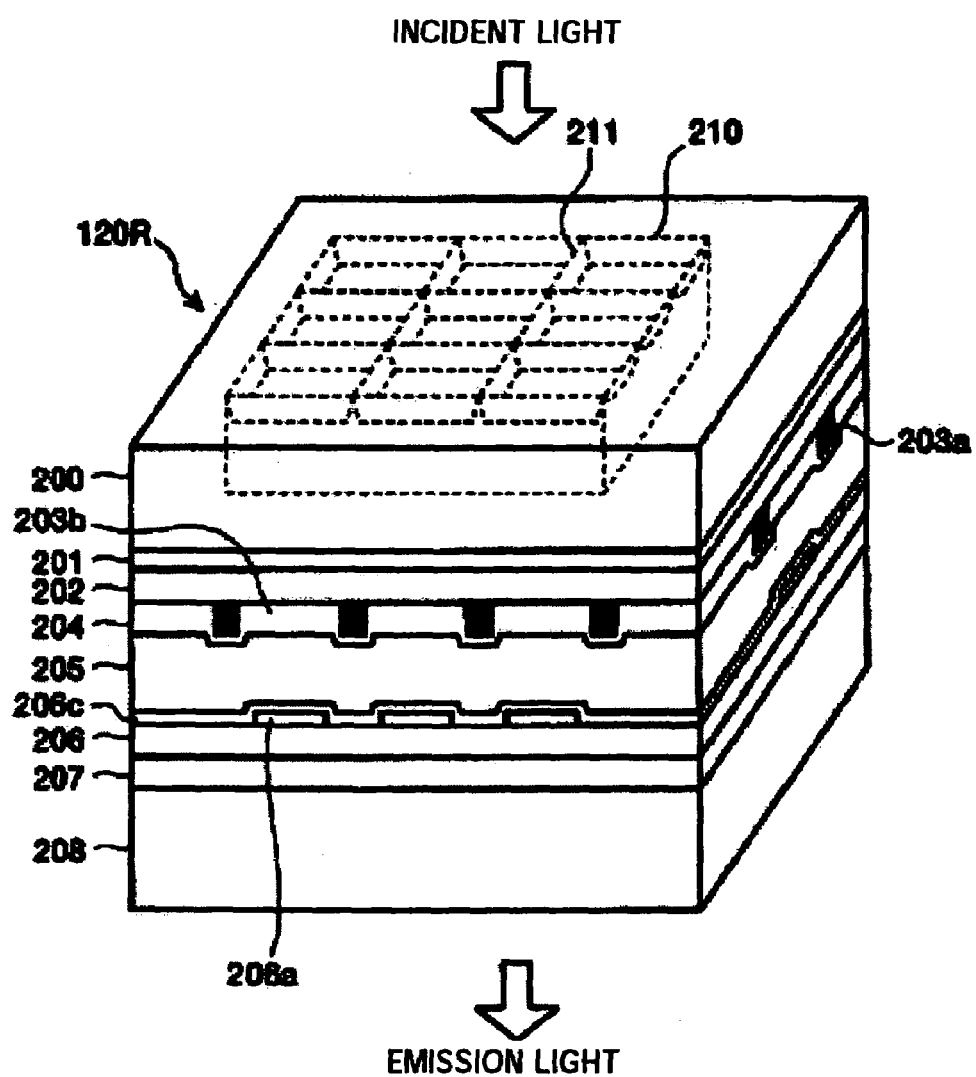
FIG. 2 is a perspective view showing the construction of a liquid crystal panel.

FIG. 2 is a perspective view showing the construction of the main part of the liquid crystal panel 120r. The projector 100 described with reference to FIG. 1 is equipped with the three liquid crystal panels 120R, 120G and 120B. The three liquid crystal panels 120R, 120G and 120B are different from one another only in the wavelength area of light to be modulated, and has the same basic construction. Therefore, the following description will be made by using the liquid crystal panel 120R as a representative.

The R light from the light source portion 101 is incident from the upper side of FIG. 2 to the liquid crystal panel 120R, and emitted from the lower side to the screen 116. A cover glass 202 is fixed through an adhesive layer 201 to the inner side of an incident side dust-proof glass 200 as a dust-proof glass. A black matrix portion 203a and a counter electrode 204 are formed at the emission side of the cover glass 202.

A TFT substrate 206 having an orientation film 206c for orientating liquid crystal, TFT (thin film transistors) and a transparent electrode 206a is formed through an adhesive layer 207 on the inner side of an emission side dust-proof glass 208. The incident side dust-proof glass 200 and the emission side dust-proof glass 208 are adhesively attached to each other so that the counter electrode 204 and the TFT substrate 206 face each other. A liquid crystal layer 205 for displaying an image is sealed between the counter electrode 204 and the TFT substrate 206. Furthermore, a black matrix portion 203a as a light shielding portion is provided at the incident side of the liquid crystal layer 205.

A prism group 210 having plural prism elements 211 is provided to the incident side dust-proof glass 200. The construction and action of the prism element 211 will be described in detail later. The liquid crystal panel 120R is disposed so that a reference face 200b on which the prism elements 211 are arranged is substantially orthogonal to the optical axis of light from the light source portion 101. In the construction shown in FIG. 1, the first polarizing plate 121R and the second polarizing plate 122R are provided separately from the liquid crystal panel 120R. However, in place of this construction, the polarizing plate may be provided between the incident side dust-proof glass 200 and the counter electrode 204 or between the emission side dust-proof glass 208 and the TFT substrate 206. Furthermore, the prism group 210 may be formed on the first polarizing plate 121R.

Figure 3:
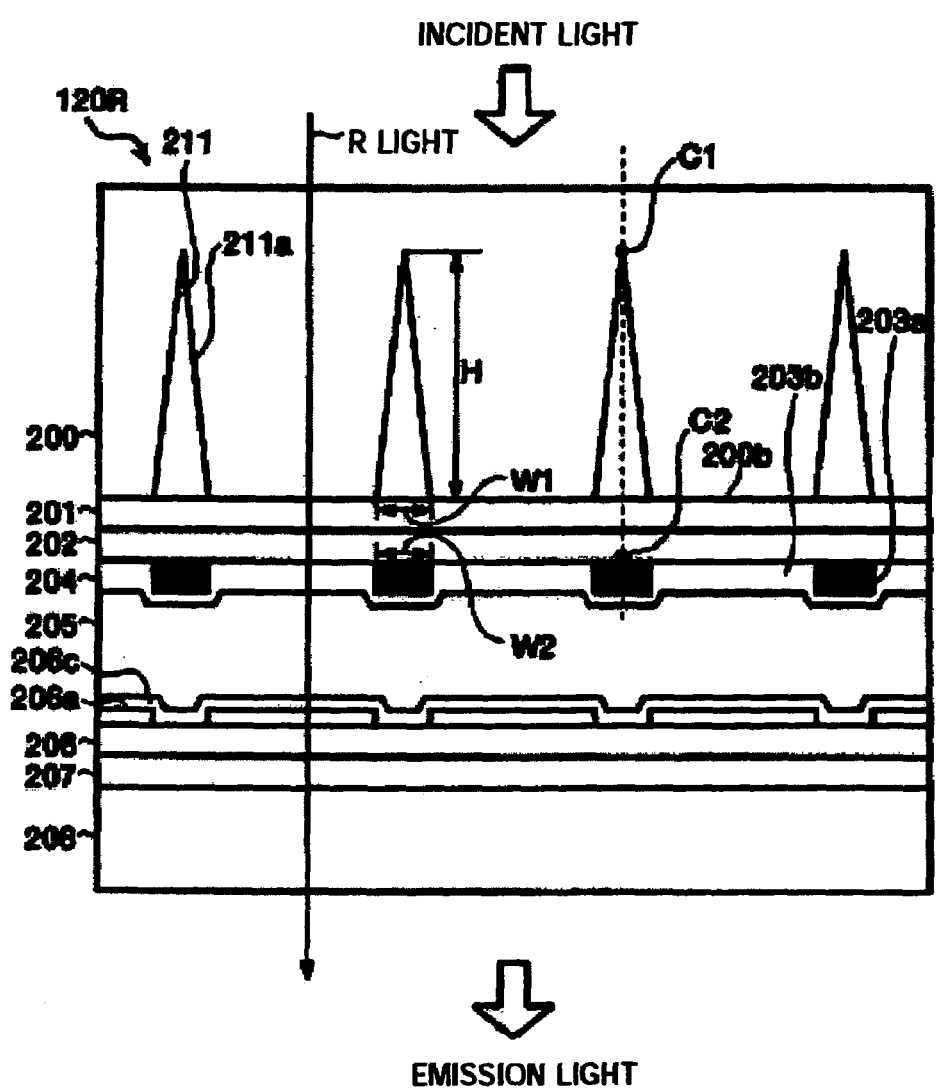
FIG. 3 is a cross-sectional view showing the construction of the liquid crystal panel.

FIG. 3 is a cross-sectional view showing the construction of the main part of the liquid crystal panel 120R. A rectangular area surrounded by the black matrix portion 203a constitutes an opening portion 203b. The opening portion 203b transmits R light from the light source portion 101 therethrough. The R light transmitted through the opening portion 203b passes through the counter electrode 204, the liquid crystal layer 205 and the TFT substrate 206 as shown in FIG. 3. The R light is modulated in accordance with an image signal in the liquid crystal layer 205 so that the polarization state thereof is converted. The light transmitted through the opening portion 203b, the liquid crystal layer 205 and the TFT substrate 206 while modulated forms a pixel of a projected image. The opening portion 203b, the liquid crystal layer 205 and the TFT substrate 206 constitute the modulator for modulating the incident light in accordance with an image signal. Also, the opening portion 203b constitute a pixel. The modulator is equipped with plural pixel portions and a light shield portion provided between the neighboring pixel portions.

Figure 4:
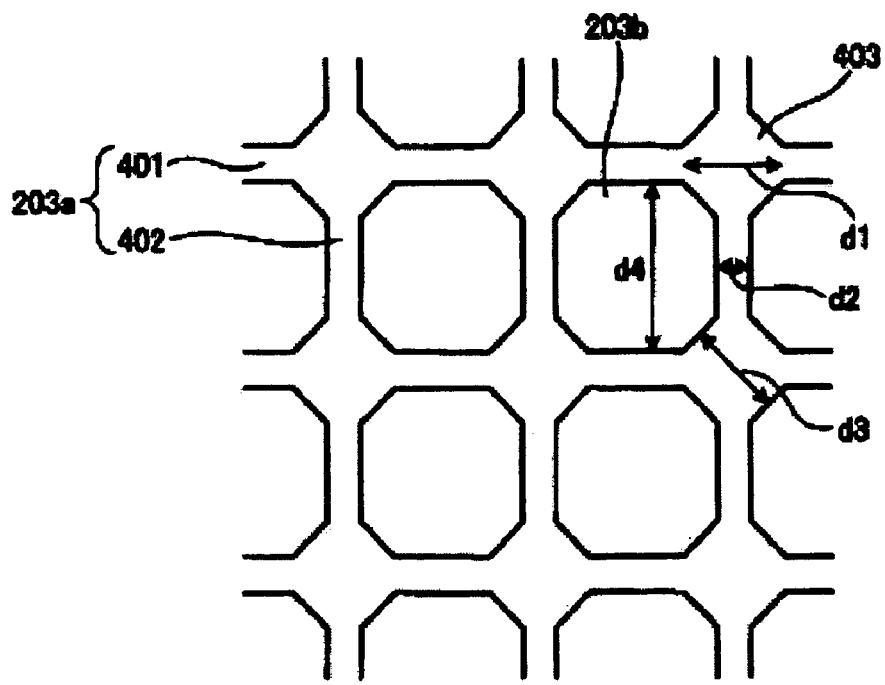
FIG. 4 is a plan view showing the main part of a black matrix portion and an opening portion.

FIG. 4 is a plan view showing the construction of the main part of the black matrix portion 203a and the opening portions 203b which are viewed from the upper side of FIG. 3. The planar construction shown in FIG. 4 is substantially parallel to the reference face 200b shown in FIG. 3. The plural opening portions 203b are arranged in a matrix form in two directions, that is, in a first direction substantially parallel to the reference face 200b and in a second direction which is substantially parallel to the reference face 200b and substantially perpendicular to the first direction. The first direction corresponds to a up-and-down direction substantially parallel to the surface of the sheet in FIG. 4. The second direction corresponds to a right-and-left direction substantially parallel to the surface of the sheet in FIG. 4. The black matrix portion 203a comprises a first black matrix portion 401 as a first light shielding portion whose longitudinal direction corresponds to the first direction, and a second black matrix portion 402 as a second light shielding portion whose longitudinal direction corresponds to the second direction.

The first black matrix portion 401 and the second black matrix portion 402 are arranged so as to cross each other at a cross portion 403. Each of the first black matrix portion 401 and the second black matrix portion 402 are formed so that the width d1 thereof at the cross portion 403 is larger than the width d2 thereof at the other portion than the cross portion 403 (hereinafter referred to as "non-cross portion"). The width d1, d2 corresponds to the width of the first black matrix portion 401 and the second black matrix portion 402 in the direction substantially perpendicular to the longitudinal direction.

An advantage of the construction of this embodiment will be described while comparing a case where the first and second black matrix portion having a substantially fixed width are arranged in a lattice shape. Electrical parts such as transistors, capacitors, etc. are disposed below the first and second black matrix portions 401 and 402. The first and second black matrix portions 401 and 402 are formed so that the widths thereof at the cross portions 403 are larger than the widths thereof at the non-cross portions, whereby the electrical parts which have been hitherto disposed below the other portions than the cross portions 403 can be disposed below the cross portions 403.

When the electrical parts are shifted from the non-cross portions to the cross portions 403, the first and second black matrix portions 401 and 402 can be designed so that the width d2 thereof at the non-cross portions is smaller as compared to conventional one. Accordingly, as compared with the spatial light modulator described in connection with the related art, the opening portion 203b can be designed so that the width d4 thereof is larger. By using the larger opening portions 203b, a larger amount of light can be modulated as compared to conventional one. Furthermore, by providing the larger opening portions 203b, a larger amount of light traveling straightly along the optical axis can be made incident to the opening portions 203b. Still furthermore, it is possible to make a larger amount of light incident to the vicinity of the center portion among the opening portions 203b at which the orientation state of the liquid crystal is stable. Accordingly, the contrast can be enhanced, and the incident light can be efficiently used.

Figure 5:
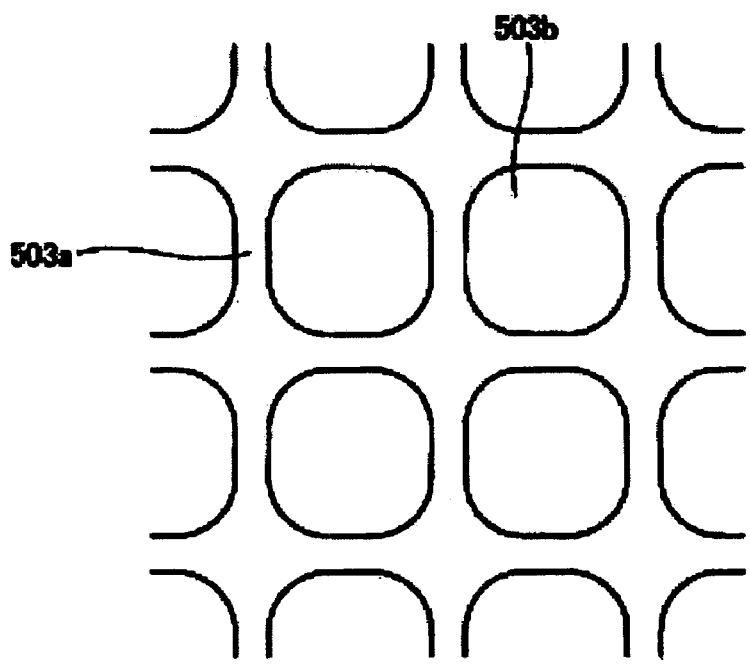
FIG. 5 is a diagram showing the shape of the black matrix portion.

The cross portion 403 shown in FIG. 4 has a square shape having a diagonal line of width d1. The opening portion 203 is designed to have such a polygonal shape that the four corners of a square shape are removed. For example, when the opening portions 203b are formed at a pitch of 15 micrometers, the cross portion 403 can be designed to have a rectangular shape having one side of 9 micrometers. In this case, the first and second black matrix portions 401 and 402 can be designed so that the width d2 at the non-cross portions is equal to 3 micrometers. The construction of the black matrix portion and the construction of the opening portion are not limited to those of FIG. 4. For example, the black matrix portion 203a and the opening portion 203b shown in FIG. 4 may be rounded at the corner portions thereof so as to achieve black matrix portions 503a and opening portions 503b as shown in FIG. 5.

Returning to FIG. 3, each prism element 211 as the optical path deflector reflects incident light to the opening portion 203b. The slant surface 211a of the prism element 211 serves a reflecting portion for reflecting the incident light to the opening portion 203b serving as the pixel portion. The slant surface 211a is formed to have a predetermined slope. The details of the slope of the slant surface 211a will be described later. The prism elements 211 are located in the neighborhood of the modulator and arranged in connection with the positions of the black matrix portions 203a. Accordingly, the light amount of light to be incident to the black matrix portions 203a can be reduced.

In the cross-sectional construction shown in FIG. 3, each prism element 211 is designed to have a substantially isosceles triangular shape whose one side is constructed by the slant surface 211a. By properly setting the direction or angle of the slant surface 211a, the direction of deflecting the optical path of the incident light or the deflection amount can be easily controlled. The apex C1 of the triangle concerned substantially corresponds to the center position C2 of the black matrix portion 203a. Furthermore, the length w1 of the bottom of the triangle (two-dimensionally, the area of the base) and the length W2 of at least the black matrix portion 203a (two-dimensionally, area) are substantially equal to each other (the same size). Accordingly, the areas in the neighborhood of the black matrix portions 203a which do not contribute to the modulation of the incident light can be effectively used.

More preferably, the length W1 (area) of the bottom of the triangle is larger than the length W2 (area) of the black matrix portion 203a. Accordingly, a margin area for preventing a light beam incident from an oblique side to the liquid crystal panel 120R from being incident to the black matrix portion 203a can be secured. Furthermore, the prism element 211 is designed so that the length H thereof in the optical axis direction corresponding to the direction substantially vertical to the reference face 200b ranges from 15 times to 250 times of the length W1 thereof in the direction substantially parallel to the reference face 200b. In the following description, with respect to the prism element 211, the fact that the length H ranges from 15 times to 250 times of the length W1 is represented by an expression that the aspect ratio ranges from 15 to 250. The action and effect achieved by setting the aspect ratio of the prism element 211 to 15 to 250 will be described later.

Figure 6:
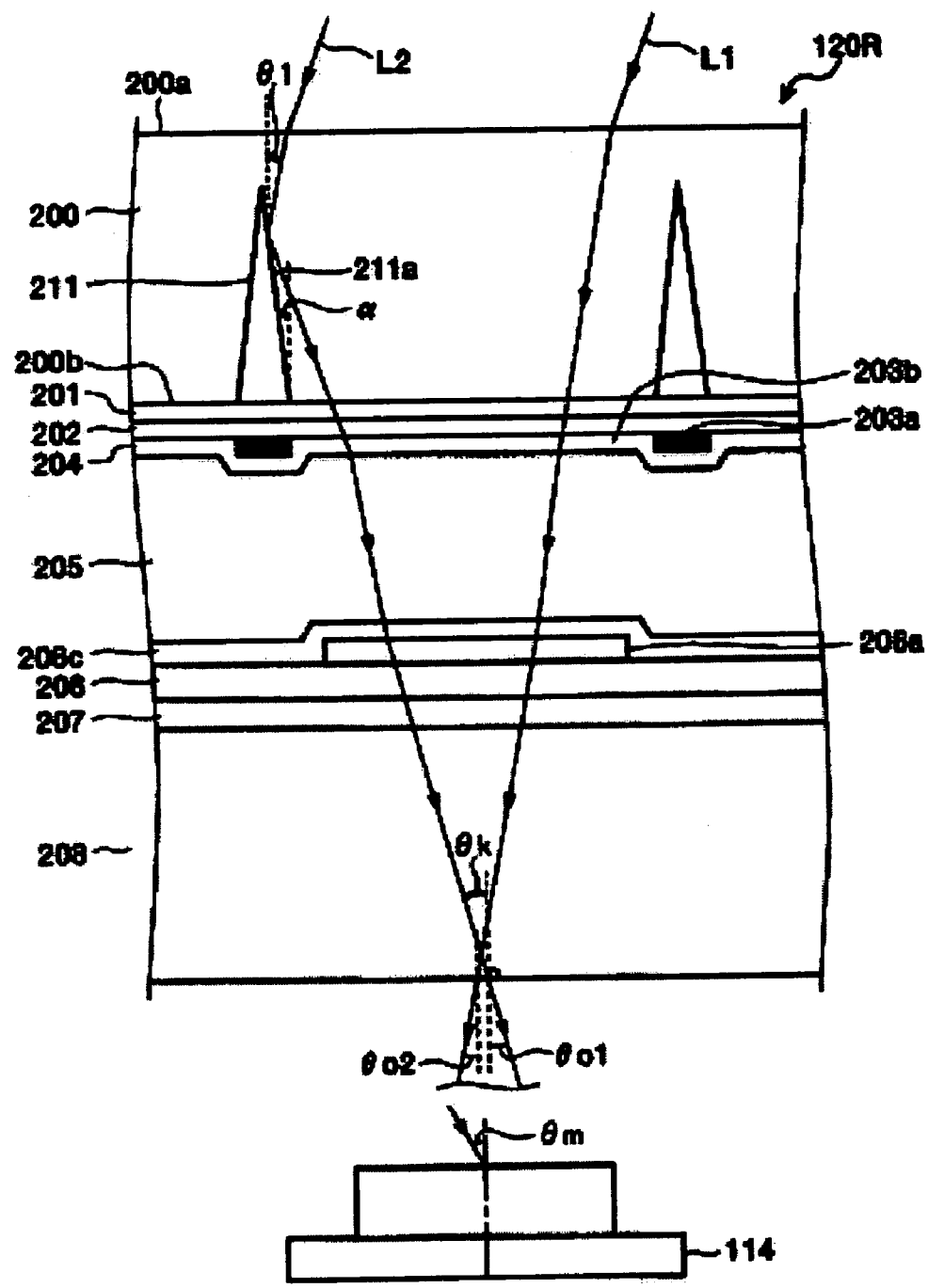
FIG. 6 is a diagram showing an action of light incident to the liquid crystal panel.

FIG. 6 shows an action of light L1, L2 incident to the liquid crystal panel 120R. Light is reflected or refracted at an interface having a refractive index difference. In order to simplify the description, FIG. 4 shows an optical path on the assumption that light straightly travels at an interface having a minute refractive index difference. Light L1 is directly incident to the opening portion 203b without passing through the prism element 211. The light L1 traveling through air is incident to the incident face 200a of the incident side dust-proof glass 200 formed of quartz glass, for example.

The light L1 incident to the incident side dust-proof glass 200 is successively transmitted through the incident side dust-proof glass 200, the adhesive layer 201 and the cover glass 202 in this order. As described above, the modulator is constructed by the opening portions 203b, the counter electrode 204, the liquid crystal layer 205 and the TFT substrate 206. The light L1 modulated in accordance with an image signal is transmitted through the adhesive layer 207, and emitted from the emission side dust-proof glass 208. In order to efficiently project the light L1, it is desired that the emission angle θo2 of the light L1 is smaller than the maximum angle θm settled by NA of the projection optical system 114.

Figure 7:
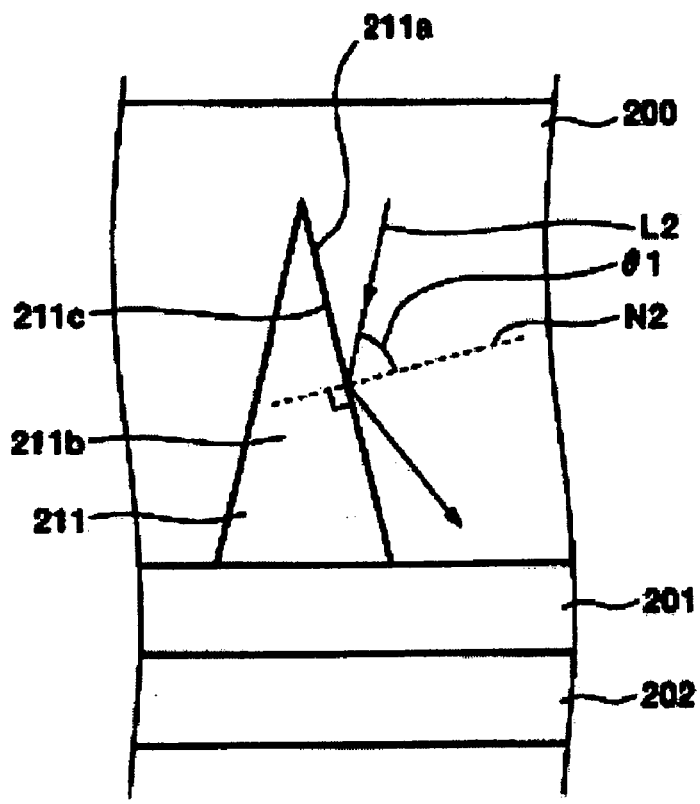
FIG. 7 is a diagram showing total reflection of light at a prism element.

The light L2 incident to the incident side dust-proof glass 200 from a position different from the light L1 is incident to the slant surface 211a. The prism element 211 is constructed by a member having a smaller refractive index than the incident side dust-proof glass 200. In order to reduce the light amount loss caused by reflection, it is desired that the prism element 211 has such a refractive index that the incident light L2 is totally reflected to the opening portion 203b corresponding to the pixel portion. Referring to FIG. 7, it is required to satisfy the following equation (2) in order to totally reflect the light L2 from the slant surface 211a.

$$\sin\theta1 > n2/n1 \tag{1}$$

Here, θ1 represents the incident angle of the light L2 to the normal line N2 of the slant surface 211, n1 represents the refractive index of the incident side dust-proof glass 200 and n2 represents the refractive index of the prism element 211. Furthermore, n1 and n2 satisfy the relationship: n1>n2.

Returning to FIG. 6, the light L2 reflected from the slant surface 211a is transmitted through the adhesive layer 201 and the cover glass 202 and then incident to the opening portion 203b. The light L2 incident to the opening portion 203b travels as in the case of the light L1, and then it is emitted from the emission side dust-proof glass 208.

Figure 8:
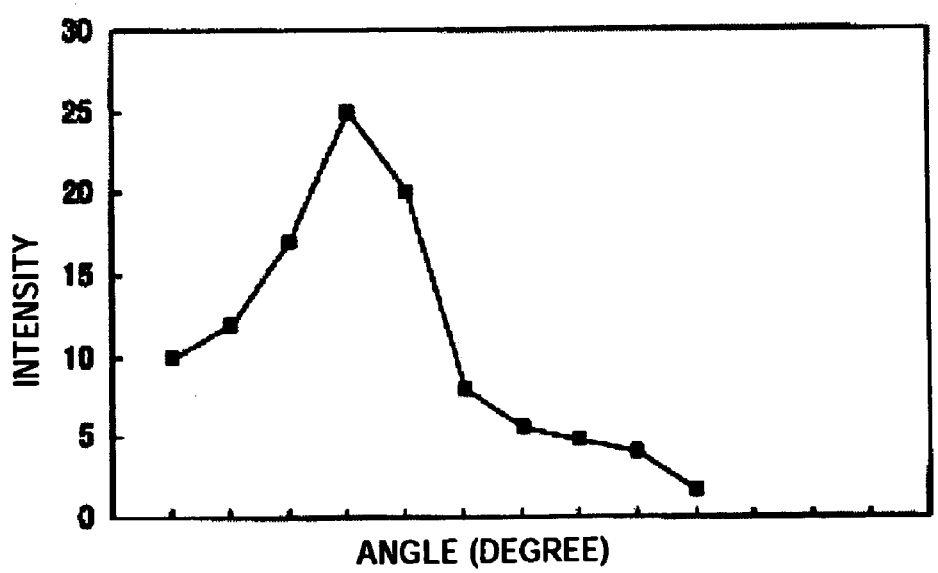
FIG. 8 is a diagram showing an example of a light beam angle distribution of illumination light.

FIG. 8 is a graph showing an example of a light beam angle distribution of illumination light from the light source portion 101. The ordinate axis of the graph of FIG. 8 represents the intensity of light, and the abscissa axis represents the light beam angle. With respect to the illumination light from the light source portion 101, light beams having light beam angles of 6 degrees or less occupy 97.6%, for example, of the overall illumination light. In this case, assuming that light beams whose light beam angles are equal to 6 degrees or less can be modulated in the liquid crystal panel 120R, the liquid crystal panel 120R can use light beams of at least 97.6% of the illumination light from the light source portion 101.

Returning to FIG. 6, the maximum value θm of the light beam angle of light which can be taken by the projection optical system 114 can be represented by the following equation:

$$\theta m = \arctan\{1/(2F)\} \tag{3}$$

Here, F represents the f-number of the projection optical system 114. For example, when the f-number F of the projection optical system 114 is equal to 1.8, the maximum value θm of the light beam angle calculated from the equation (3) is equal to 15.5 degrees.

It is assumed that the incident angle θi of the light L2 to the incident face 200a is equal to 4 degrees. As shown in the light beam angle distribution of FIG. 8, the light L2 is the largest amount of light beam among light beams incident from the light source portion 101 into the liquid crystal panel 120R. The slant face 211a serving as the reflection portion is formed so that the intersecting angle α between the slant surface 211a and the normal line of the reference face 200b is equal to 3 degrees, for example. When the light L2 is reflected from the slant surface 211a having the intersecting angle α of 3 degrees, the light L2 varies its traveling direction so that the light beam angle is equal to 10 degrees, for example.

Assuming that the light L2 subsequently travels at the light beam angle concerned, the light beam angle θk in the emission side dust-proof glass 208 is equal to 10 degrees. Furthermore, the light emitted from the liquid crystal panel 120R is refracted at the interface between the emission side dust-proof glass 208 and the air when emitted from the emission side dust-proof glass 208 in the travel direction into the air. The light beam angle θo1 of light emitted from the liquid crystal panel 120R can be calculated from the equation (4).

$$\theta o1 = \{a\sin(\sin \theta k * n3)\} \quad (4)$$

Here, θo1 represents the light beam angle of light emitted from the liquid crystal panel 120R, and also the incident angle to the projection lens 114. θk represents the light beam angle in the emission side dust-proof glass 208, and n3 represents the refractive index of the emission side dust-proof glass 208. For example, when quartz glass of 1.46 in refractive index is used as the emission side dust-proof glass 208, the light L2 having the angle θk of 10 degrees in the emission side dust-proof glass 208 is incident to the projection lens 114 while the beam angle θo1 is equal to 14.6 degrees.

When the maximum value θm of the light beam angle calculated from the equation (3) is equal to 15.5 degrees, the light L2 having the light beam angle θo1 of 14.6 degrees can be taken into the projection optical system 114. Accordingly, by setting the angle α of the slant surface 211a to 3 degrees, the liquid crystal panel 120R can deflect light having an incident angle θi of 4 degrees and emit light having a light beam angle at which the light concerned can be projected from the projection optical system 114.

It is desired that the prism element 211 deflects the incident light intersecting to the normal line of the reference face 200b at a predetermined angle, for example, 6 degrees so that the light thus deflected has an angle θo satisfying the following equation (1):

$$0 \leq \theta o \leq \arctan \{1/(2F)\} \quad (1)$$

For example, at least 97.6% of illumination light from the light source portion 101 can be projected by deflecting the incident light having the light beam angle of 6 degrees so as to have the angle θo satisfying the equation (1). By determining the angle α of the slant surface 211a as described above, the light modulated by the spatial light modulators 110R, 110G and 110B can be efficiently projected. Accordingly, the incident light can be efficiently projected and a bright image can be displayed. The prism element 211 is not limited to the construction that the incident light intersecting to the normal line of the reference face 200b at 6 degrees is deflected so that the light has the angle θo satisfying the equation (1). As shown in the light beam angle distribution of FIG. 8, the light source portion 101 supplies illumination light containing the largest amount of light having the light beam angle of 4 degrees. Accordingly, the prism element 211 may be designed so that the light having the light beam angle of 4 degrees which is the largest amount of light contained in the illumination light is deflected so as to have the angle θo satisfying the equation (1), for example.

The slant surface 211a is not limited to the construction that the angle α between the slant surface 211a and the normal line of the reference face 200b is equal to 3 degrees. The slant surface 211a may be designed so that the angle α between the slant surface 211a and the normal line of the reference face 200b is equal to 3 degrees or less. For example, when the angle α is set to 2 degrees, the prism element 211 can deflect light of 6 degrees in light beam angle so that the light has a light beam angle of 10 degrees. By setting the angle α to 3 degrees or less, the incident light can be converted to light having a light beam angle at which the light concerned can be sufficiently taken by the projection optical system 114. The slant surface 211a serving as the reflection portion has an effective reflection area for converting the incident light to light having a light beam angle at which the light concerned can be sufficiently taken by the projection optical system 114.

Figure 9:
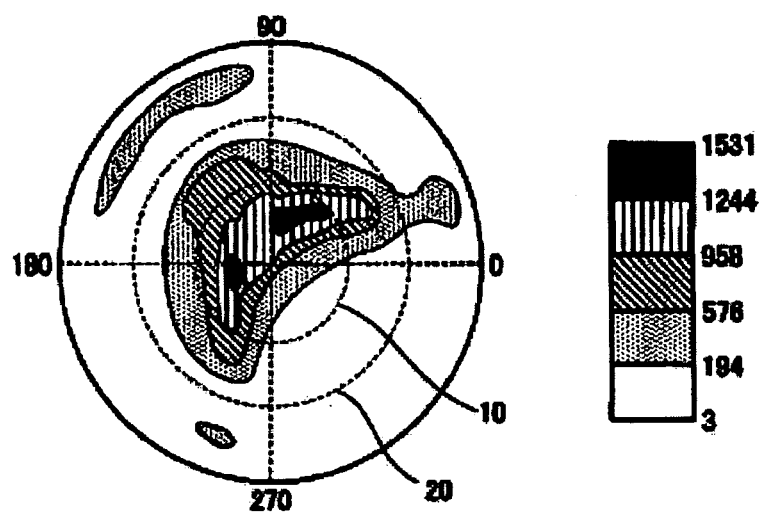
FIG. 9 is a diagram showing the relationship between the light beam angle of incident light and the contrast.

FIG. 9 shows the relationship between the light beam angle of light incident to the liquid crystal layer 205 and the contrast. In FIG. 9, the numeric values of 0, 90, 180, 270 indicated along a circle indicated by a solid line show the directions of the incident light within a plane vertical to the optical axis. Furthermore, the numeric values of 10 and 20 indicating circles indicated by broken lines represent the light beam angle between the incident light and the optical axis. The hatching shown in FIG. 9 represents a contrast distribution. The contrast is represented by the rate between the maximum brightness and the minimum brightness of modulated light. In order to display an image with high contrast, it is desired that the light beam angle of the incident light is small, that is, it is equal to 10 degrees or less, for example.

Furthermore, by providing the prism element 211 with the slant surface 211a in which the intersecting angle α to the normal line of the reference face 200b is equal to 3 degrees or less, the incident light can be deflected while reducing increase of the light beam angle. Therefore, by providing the prism element 211, not only the incident light can be converted to light having a light beam angle at which the light concerned can be sufficiently taken by the projection optical system 114, but also a high contrast image can be displayed.

As described above, the prism element 211 is designed so that the aspect ratio ranges from 15 to 250. For example, in the case of a prism element 211 having an aspect ratio of 15 in which the length W1 of the bottom of the triangular shape is equal to 0.8 micrometer and the length H in the optical axis direction is equal to 12 micrometers (see FIG. 3), the slant surface 211a having the intersecting angle α of 1.9 degree to the normal line of the reference face 200b is provided to the prism element 211. Furthermore, in the case of a prism element 211 having an aspect ratio of 250 in which the length W1 of the bottom of the triangular shape is equal to 0.8 micrometer and the length H in the optical axis direction is equal to 200 micrometers, the slant surface 211a having the intersecting angle α of about 0.11 degree to the normal line of the reference face 200b is provided to the prism element 211. As described above, when the prism element 211 having the aspect ratio ranging from 15 to 250 is used, the incident light can be deflected so that the light beam angle is reduced. Accordingly, the high contrast can be achieved, and also the incident light can be efficiently used. Furthermore, a bright image can be displayed with high contrast by the projector 100.

More preferably, it is desired that the prism element 211 is designed so that the aspect ratio ranges from 20 to 200. In this case, higher contrast can be achieved and also the incident light can be more efficiently used. For example, in the case of a prism element 211 having an aspect ratio of 20 in which the length W1 of the bottom of the triangular shape is equal to 2 micrometers and the length H in the optical axis direction is equal to 40 micrometers, the slant surface 211a having the intersecting angle α of 1.43 degree to the normal line of the reference face 200b is provided to the prism element 211. The prism element 211 having the aspect ratio of 20 can deflect incident light having a light beam angle of 5 degrees so that the light has a light beam angle of 11.5 degrees, for example.

In the case of a prism element 211 having an aspect ratio of 200 in which the length W1 of the bottom of the triangular shape is equal to 2 micrometers and the length H in the optical axis direction is equal to 400 micrometers, the slant surface 211*a* having the intersecting angle α of about 0.14 degree to the normal line of the reference face 200*b* is provided to the prism element 211. The prism element 211 having the aspect ratio of 200 can deflect incident light having a light beam angle of 5 degrees so that the light has a light beam angle of 7.7 degrees. For example, when a projection optical system 114 having an f-number F of 2 is used both of the cases where the angle θo is 11.5 and 7.7 degrees satisfy the equation (1). Accordingly, the projection optical system 114 having the f-number F of 2 has a take-in angle of 14 degrees, and thus it can take light from the prism element 211 having an aspect ratio ranging from 20 to 200. Furthermore, the contrast can be enhanced by deflecting the incident light so that the light beam angle is reduced. The light beam angle of light after the light is deflected by the prism element 211 is not limited to that described above, and it may be varied in accordance with each construction of the liquid crystal panel 120R.

Figure 10:
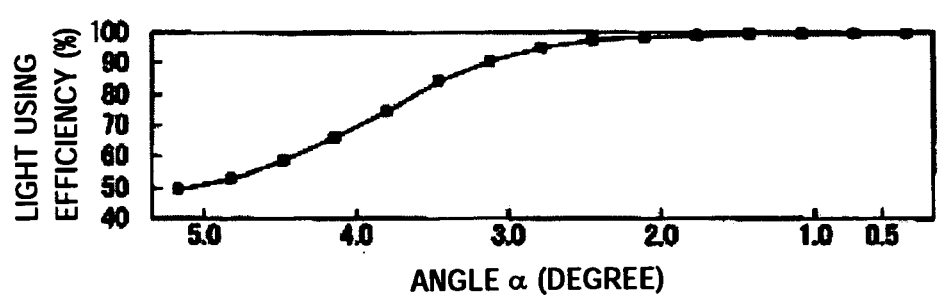
FIG. 10 is a diagram showing the relationship of an angle of a slant face and a light using efficiency.

FIG. 10 is a graph showing the relationship between the angle α of the slant surface 211*a* and the light using efficiency of light from the light source portion 101. The light using efficiency of light from the light source portion 101 is a rate of light which can be taken by the projection optical system 114 over the light from the light source portion 101. By using the prism element 211 in which the angle α of the slant surface 211*a* is equal to 3 degrees or less, the light using efficiency can be set to 90% or more.

Figure 11:
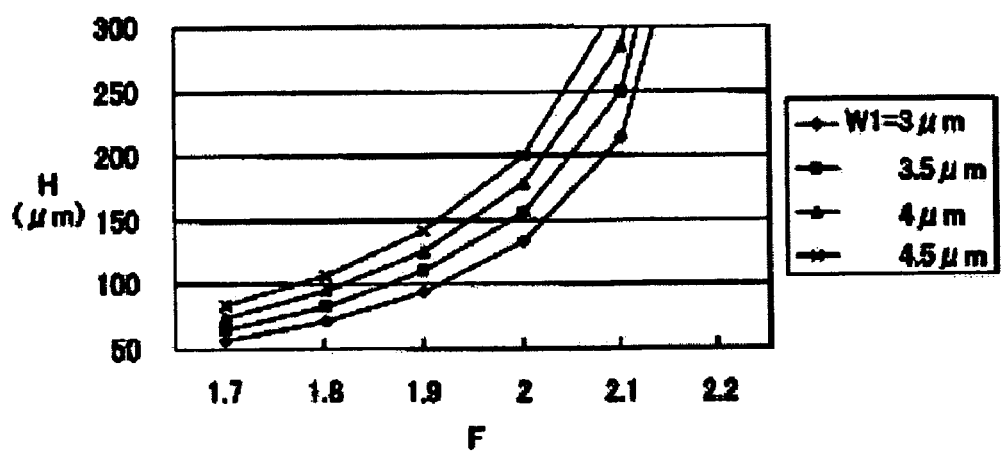
FIG. 11 is a diagram showing the relationship between the f-number of a projection lens and the length of a prism element.

FIG. 11 shows the relationship between the f-number F of the projection optical system 114 and the length H in the optical axis direction of the prism element 211 for securing the light efficiency of 98%. The ordinate axis of the graph shown in FIG. 11 represents the length H (micrometer) and the abscissa axis represents the f-number F. Furthermore, the graph of FIG. 11 shows the relationship between the f-number F and the length H every length W1 of the prism element 211 in the direction substantially parallel to the reference face 200*b*. By forming the prism element 211 under the condition shown in FIG. 11, the light using efficiency of 98% can be secured.

When the aspect ratio of the prism element 211 is set to a small value than 15, the amount of light having a large light beam angle is increased, and thus it is considered that the amount of light which cannot be taken by the projection optical system 114 is increased. Furthermore, it is also considered that the contrast is lowered because the amount of light having a large light beam angle is increased. Therefore, it is desired that the aspect ratio of the prism element 211 is set to 15 or more. Furthermore, when the aspect ratio of the prism element 211 is set to a value of 250 or more, for example, 300, the angle α of the slant surface 211*a* may be set to 0.0095 degree. As described above, it is expected that a higher effect can be achieved as the aspect ratio of the prism element 211 is increased.

With respect to the prism element 211 in which the length W1 in the direction substantially parallel to the reference face 200*b* is equal to 2 micrometers, when the aspect ratio thereof is set to 300, it is required to set the length H in the optical axis direction of the prism element 211 to about 600 micrometers. When the prism element 211 having a large length H as described above is formed, the strength of the incident side dust-proof glass 200 is insufficient, and crack or breaking of the incident side dust-proof glass 200 causes reduction of the yield. Accordingly, by setting the aspect ratio of the prism element 211 to a value in the range from 15 to 250, high contrast and a high light using efficiency can be achieved, and also sufficient strength can be achieved.

Figure 12:
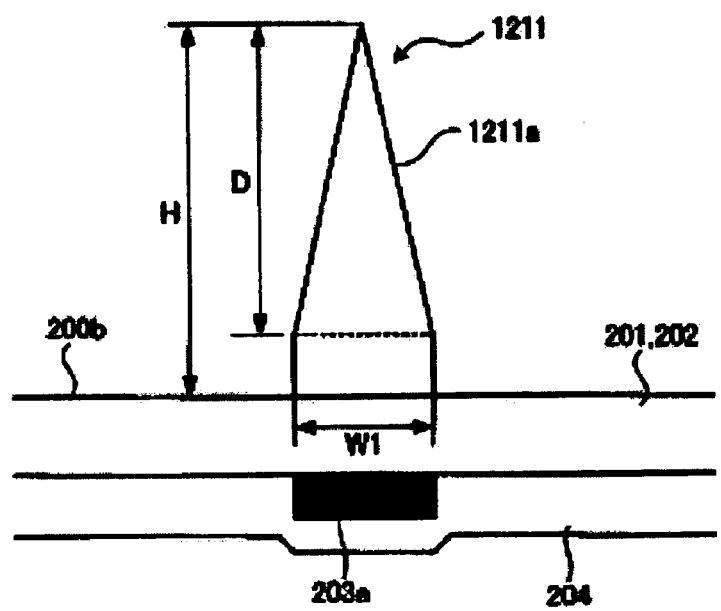
FIG. 12 is a diagram showing the shape of the prism element.

The cross-sectional shape of the prism element is not limited to a triangular shape. For example, as shown in FIG. 12, the cross-sectional shape of the prism element may be designed so that a triangular shape is put on a rectangular shape like a prism element 1211 as shown in FIG. 12. The prism element 1211 is designed so as to be triangular in cross-section at a portion of the prism element 1211 which corresponds to the length D at the light incident side out of the length H in the optical axis direction of the prism element 1211. The slant surface 1211*a* of the prism element 1211 serves as an effective reflection area having an intersecting angle of 3 degrees or less to the normal line of the reference face 200*b*.

Figure 13:
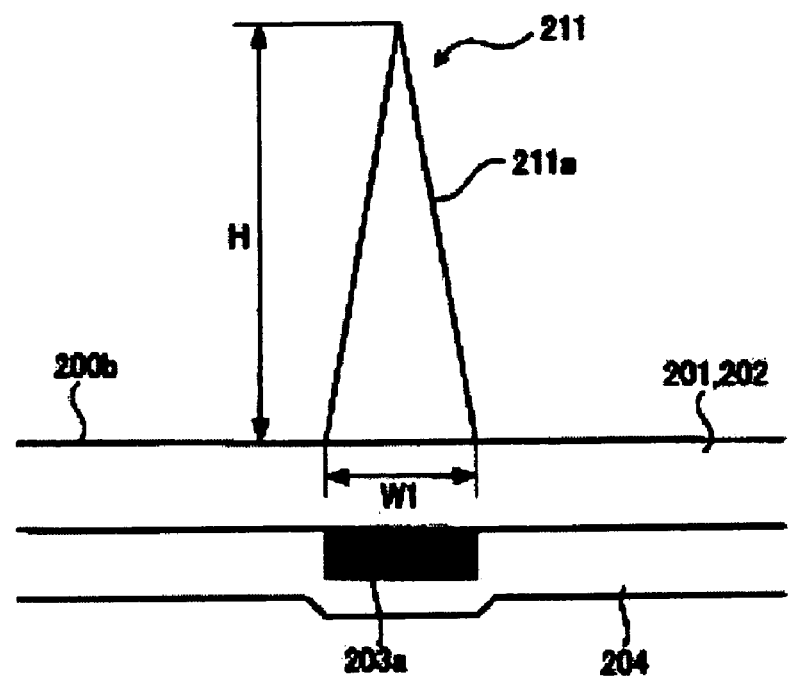
FIG. 13 is a diagram showing the shape of the prism element.

When the rectangular shape portion in cross-section and the slant surface 1211*a* serve as a reflection portion, it is desired that the slant surface 1211*a* serving as the effective reflection area occupies 70% of the whole area of the reflection portion. By setting the occupation area of the effective reflection area to 70% or more of the whole area of the reflection portion, high contrast and high light using efficiency can be achieved. The prism element 211 shown in FIG. 13 is designed so that the effective reflection area occupies 100% of the whole area of the reflection portion.

Figure 14:
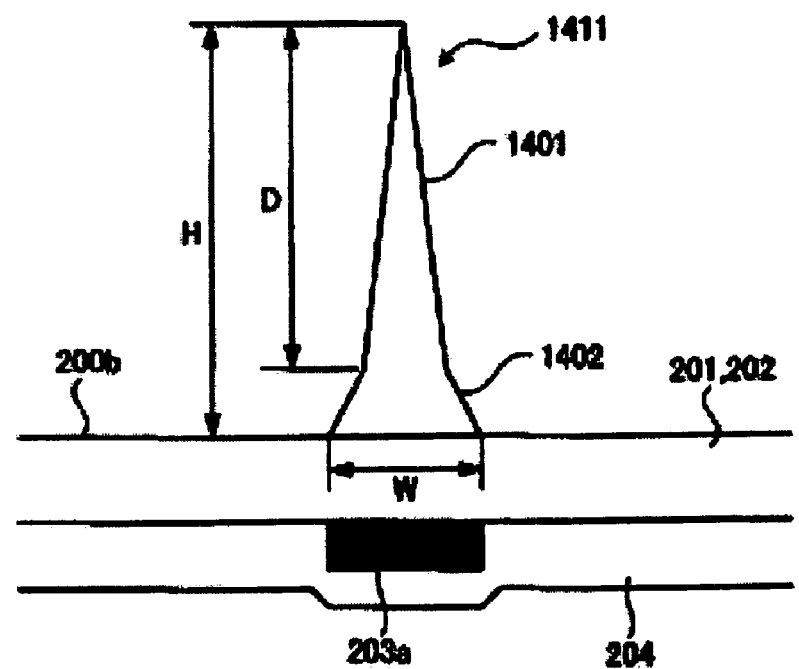
FIG. 14 is a diagram showing a prism element according to a modification of the first embodiment.

FIG. 14 is a cross-sectional view showing the construction of the main part of a prism element 1411 of a modification of the above embodiment and a peripheral portion thereof. The prism element 1411 of this modification may be applied to the liquid crystal panel 120R described above. The prism element 1411 has a first slant surface 1401 and a second slant surface 1402 which are different from each other in gradient. The first slant surface 1401 serves as a first area formed at the portion corresponding to the length D at the light incident side out of the length H in the optical axis direction of the prism element 1411.

The second slant surface 1402 is formed at the portion at the light emission side out of the length H in the optical direction of the prism element 1411. The second slant surface 1402 is a second area provided at a position which is nearer to the pixel portion than the first slant surface 1401. The first slant surface 1401 and the second slant surface 1402 are provided so that the intersecting angle between the normal line of the reference face 200*b* and the second slant surface 1402 is set to be larger than the intersecting angle between the normal line of the reference face 200*b* and the first slant surface 1401. The first slant surface 1401 serves as an effective reflection area having an intersecting angle of 3 degrees or less to the normal line of the reference face 200*b*.

Figure 15:
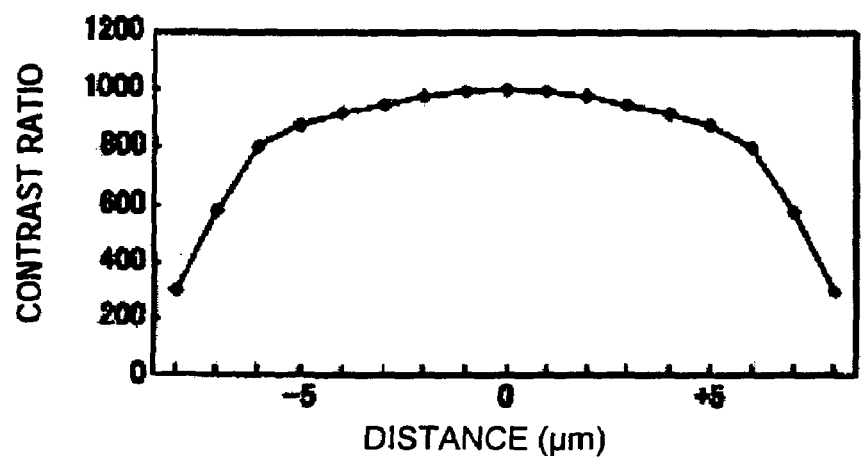
FIG. 15 is a diagram showing the relationship between the incident position of light at the opening portion and the contrast.

FIG. 15 shows an example of the relationship between the light incident position at the opening portion 203*b* and the contrast. The ordinate axis of FIG. 15 represents the contrast, and the abscissa axis represents a light incident position which is represented by the distance from the center portion of the opening portion 203*b* to the position concerned. The relationship shown in FIG. 15 is achieved when the opening portion 203*b* is designed to have a square shape of 16 micrometers on a side. It is apparent from FIG. 15 that the liquid crystal panel 120R provides higher contrast as light is incident to a position nearer to the center portion of the opening portion 203*b*.

At the peripheral portion of the opening portion 203*b*, the orientation state of liquid crystal becomes unstable by the effects of the adjacent electrodes, transistors, wires, etc. If the orientation state of the liquid crystal is unstable, the contrast might be lowered when light is incident to the peripheral portion of the opening portion 203*b*. On the other hand, the orientation state of the liquid crystal is stable at the center portion of the opening portion 203*b*. Therefore, in order to achieve high contrast, it is desired to make light incident to as the nearest position as possible to the center portion of the opening portion 203b. For example, in order to achieve high contrast of 800 or more, it is desired that light is incident to an area within 6 micrometers from the center portion of the opening portion 203b.

Assuming that the gradient of the first slant surface 1401 is equal to the gradient of the second slant surface 1402, light reflected from the second slant surface 1402 is incident to a position farther away from the center portion of the opening portion 203b than light reflected from the first slant surface 1401. When the light reflected from the second slant surface 1402 is incident to the peripheral portion of the opening portion 203b, it is difficult to achieve high contrast by the light reflected from the second slant surface 1402.

Figure 16:
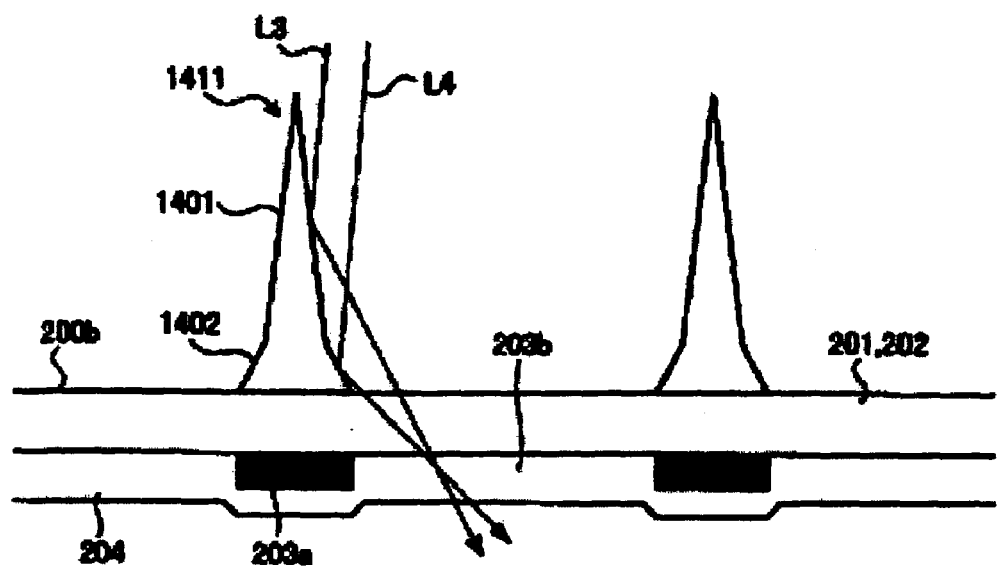
FIG. 16 is a diagram showing the action of light when a prism element shown in FIG. 14 is used.

FIG. 16 is a diagram showing an action of light when the prism element 1411 is used will be described. In this embodiment, the intersecting angle between the normal line of the reference face 200b and the second slant surface 1402 is larger than the intersecting angle between the normal line of the reference face 200b and the first slant surface 1401. Accordingly, light L4 reflected from the second slant surface 1402 can be made incident to a position near to the center portion of the opening portion 203b as in the case of light L3 reflected from the first slant surface 1401. Not only the light reflected from the first slant surface 1401, but also the light reflected from the second slant surface 1402 is made incident to a position near to the center portion of the opening portion 203b, thereby further enhancing the contrast. Furthermore, when the first slant surface 1401 serving as the effective reflection area is designed to occupy 70% or more of the whole area of the first slant surface 1401 and the second slant surface 1402, the high contrast and the high light using efficiency can be achieved.

Figure 17:
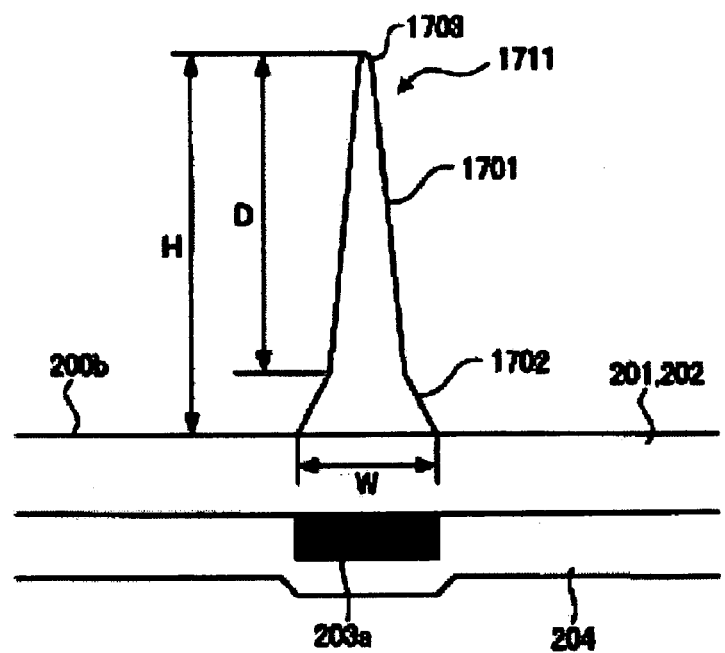
FIG. 17 is a diagram showing a modification of the prism element.
Figure 18:
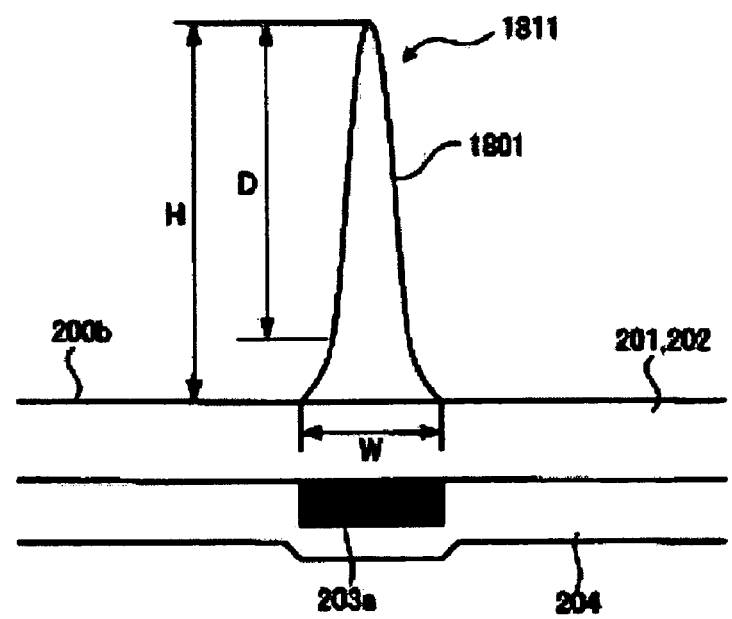
FIG. 18 is a diagram showing a modification of the prism element.

FIGS. 17 and 18 are cross-sectional views showing the constructions of the main parts of prism elements 1711, 1811 achieved by modifying the prism element 1411 of this embodiment. As in the case of the prism element 1411, the prism element 1711 shown in FIG. 17 has a first slant surface 1701 serving as a first area and a second slant surface 1702 serving as a second area. The tip portion 1703 of the prism element 1711 has a round shape. The first slant surface 1701 serves as an effective reflection area having an intersecting angle of 3 degrees or less to the normal line of the reference face 200b.

A prism element 1811 shown in FIG. 18 has a curved surface 1801 serving as a reflection portion. The curved surface 1801 corresponding to the portion having the length D at the light incident side out of the length H in the optical axis direction of the prism element 1811 serves as an effective reflection area having an intersecting angle of 3 degrees or less to the normal line of the reference face 200b. The portion of the length D of the curved surface 1801 functions as a first area. The portion other than the portion of the length D of the curved surface 1802 is an area having an intersecting angle of 3 degrees or more to the normal line to the reference face 200b. The portion other than the portion of the length D of the curved surface 1801 functions as a second area. When these prism elements 1711 and 1811 are used, the contrast can be also enhanced.

The prism element 1411 shown in FIG. 14 and the prism element 1711 shown in FIG. 17 may be formed by a dry etching method described later, for example. The prism element 1811 shown in FIG. 18 may be formed by using a laser abrasion method, for example. When the laser abrasion method is used, a laser beam is condensed onto a target constituting a material for forming the prism element 1811, and material particles achieving energy from the laser beam are transported onto the substrate, thereby forming the prism element 1811. The shape of the prism element is not limited to that shown in the figures, and other shapes may be used. For example, the prism element 1711 of FIG. 17 is not limited to the construction that the tip portion 1703 thereof has a round shape, and a flat face substantially parallel to the reference face 200b may be formed at the tip portion.

Second Embodiment

Figure 19:
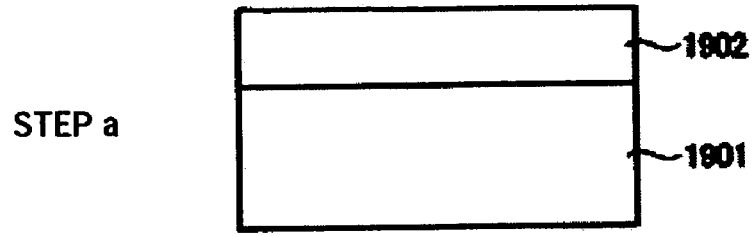
FIG. 19 is a diagram showing a method of manufacturing a spatial light modulator according to a second embodiment of the invention.
Figure 19:
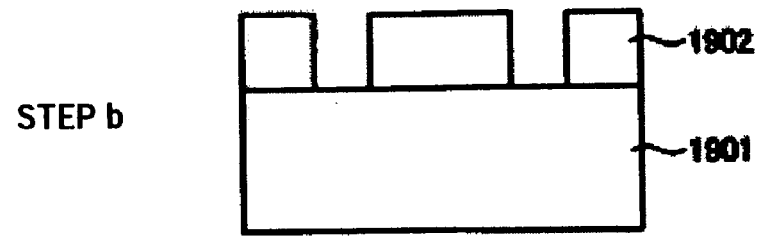
Figure 19:
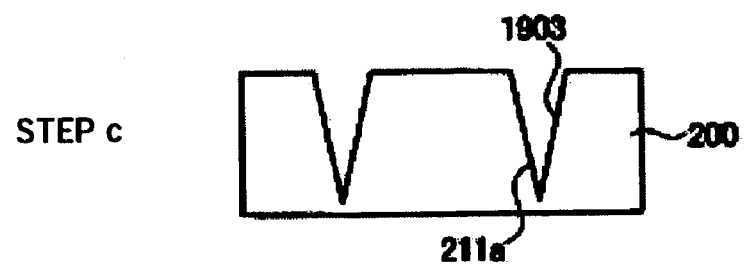

FIG. 19 is a diagram showing a method of manufacturing a spatial light modulator according to a second embodiment of the invention. A procedure of forming a prism element which is a feature portion of the spatial light modulator will be mainly described. The prism element may be formed by a laser abrasion method or a method using a dry etching process. According to the method using the laser abrasion, $CO_2$ laser is irradiated onto a transparent substrate on the basis of preset data to form a prism element. In the procedure shown in FIG. 19, the prism element 211 is formed by the dry etching process using a thick film resist.

First, a resin resist layer 1902 is formed on a substrate 1901 in a step a. A glass substrate or a transparent resin substrate may be used as the substrate 1901. The resin resist layer 1902 is a mask layer, and it is coated at a thickness of 50 micrometers to 200 micrometers, for example. SU-8, KMPR (both are registered trademarks of Microchem company) may be used for the resin resist layer 1902. Subsequently, as shown in a step b, patterning is carried out so as to remove the resin resist layer 1902 at a portion where the prism element 211 will be formed. After the patterning, baking is carried out at 100° C. for 60 minutes.

Subsequently, dry etching is carried out by using the patterned resin resist layer 1902 as a hard mask. An ICP dry etching device that can form high density plasma may be used for the dry etching process. As shown in a step c, grooves 1903 each of which has a substantially triangular section are formed in the substrate 1901 by dry etching. For example, fluoride type gas such as $C_4F_8$, $CHF_3$ or the like may be used as etching gas with which high-density plasma can be uniformly formed in an etching area.

By setting the etching selection ratio between the material of the substrate 1901 and the material of the resin resist layer 1902 to 4:1, for example, grooves 1903 having a depth which is substantially four times as large as the thickness of the resins resist layer 1902 can be formed in the substrate 1901. In order to prevent the resist from being carbonized under the etching environment, the substrate 1901 may be cooled by a chiller, or a cooling time may be provided during an etching cycle. The dry etching process using SU-8 is described in "Deep Dry Etching of Quartz Plate Over 100 µm in Depth Employing Ultra-Thick Photoresist (SU-8)" (Japanese Journal of Applied Physics. Vol. 42 (2003) pp. 3702–3706, The Japan Society of Applied Physics), for example.

The wall surface of each groove 1903 thus formed serves as the slant surface 211a of the prism element 211. Air or other transparent materials are sealingly filled with the adhesive layer 201 in the grooves 1903 formed in the step c to form the prism elements 211. When air is filled in the prism elements 211, it is desired to reduce the inner pressure of the prism elements 211. By reducing the inner pressure of the prism elements 211, thermal expansion of air in the prism elements 211 due to temperature increase can be prevented, and exfoliation, etc. of parts in the neighborhood of the prism elements 211 can be prevented. The spatial light modulators 110R, 110G and 110B can be formed by using the incident side dust-proof glass 200 formed as described above.

FIGS. 20A and 20B show a process of forming the prism element 211 by the dry etching process using a metal hard mask. First, in the step a of FIG. 20A, a metal layer 2002 is formed on the substrate 1901. For example, chromium or nickel may be used as the material of the metal layer 2002. The metal layer 2002 may be formed of metal material by CVD, sputtering, plating or the like. Subsequently, a resist layer 2003 is formed on the metal layer 2002 in a step b. The resist layer 2003 is subjected to patterning in a step c (photolithography step). The pattering of the resist layer 2003 is carried out so that grooves are formed at the positions where the prism elements 211 are formed.

Subsequently, the metal layer 2002 is subjected to patterning by etching in a step d. The etching of the metal layer 2002 may be carried out by using any one of a wet etching method using copper chloride ($FeCl_3$), a dry etching, an ion milling method. Subsequently, dry etching is carried out by using an ICP dry etching device in a step e of FIG. 20B. Fluoride type gas such as $C_4F_8$, $CHF_3$ or the like may be used as etching gas.

It is possible to increase the etching selection ratio under a condition that the etching rate of the material of the substrate 1901 is increased. The deep grooves 1903 can be formed in the substrate 1901 by increasing the etching selection ratio as shown in a step f. For example, the deep grooved 1903 can be formed in the substrate 1901 formed of quartz material by carrying out etching under the condition of a bias power of 800 W, a bias voltage of 500 volts, a $C_4F_8$ gas flow rate of 10 sccm and a $CHF_3$ gas flow rate of 30 sccm.

The wall surfaces of the grooves 1903 thus formed serve as the slant surfaces 211a of the prism elements 211. The inclination angle of each slant surface 211a can be properly adjusted by varying the etching selection ratio during etching. The etching selection ratio can be varied by adjusting at least one of the gas pressure, the bias voltage, the bias power, etc. By changing the etching condition so that the etching selection ratio is set to a smaller value at a farther position from the metal layer 2002 than that at a nearer position to the metal layer 2002 in the substrate 1901, the prism element 1411 (see FIG. 14) or the prism element 1711 (see FIG. 17) that has slant surfaces different in gradient can be formed. Finally, the metal layer 2002 is removed in a step g, whereby the incident side dust-proof glass 200 having the slant surface 211a can be formed. Residuals occurring in the etching step can be removed by carrying out a $O_2$-based cleaning work or adding $O_2$, Ar gas during the step.

FIGS. 21A and 21B show another process of forming the prism element 211 by the dry etching process. In the step a of FIG. 21A, a resist layer 2102 is formed on the substrate 1901. The resist layer 2102 may be formed by a spin coating method or a spray coating method, for example. The resist layer 2102 is subjected to patterning in a step b (photolithography step). In the subsequent step c, a metal layer 2103 is formed on the substrate 1901 and the resist layer 2102.

For example, chromium or nickel may be used as the material of the metal layer 2103. The metal layer 2103 may be formed of metal material by carrying out CVD, sputtering, plating or the like. Subsequently, in a step d, the metal layer 2103 is subjected to pattering by a lift-off method. The same dry etching as the above process is carried out from a step e to a step g, whereby the incident side dust-proof glass 200 having the slant surface 211a can be formed.

As described above, the spatial light modulator of aspect of the invention is suitable for a liquid crystal type spatial light modulator device used for a projector.

The entire disclosure of Japanese Patent Application No. 2005-030118, filed Feb. 7, 2005 is expressly incorporated by reference herein.

What is claimed is:

1. A spatial light modulator comprising:
   a modulator for modulating incident light in accordance with an image signal; and
   an optical path deflector that is provided in the neighborhood of the modulator and reflects the incident light to the modulator,
   wherein the modulator includes plural pixel portions arranged in a matrix form and a light shielding portion provided between the pixel portions, and the optical path deflector is a prism element having a reflection portion for reflecting the incident light to the pixel portions, the prism element being disposed at a position corresponding to the light shielding portion on a reference face, and the length of the prism element in a direction substantially perpendicular to the reference face being set in the range from 15 times to 250 times of the length of the prism element in a direction substantially parallel to the reference face.

2. The spatial light modulator according to claim 1, wherein the length of the prism element in the direction substantially perpendicular to the reference face ranges from 20 times to 200 times of the length in the direction substantially parallel to the reference face.

3. The spatial light modulator according to claim 1, wherein the reflection portion has a first area and a second area disposed to be located at a shorter distance from the pixel portion than the first area, and the first area and the second area are provided so that the intersecting angle between the normal line of the reference face and the second area is larger than the intersecting angle between the normal line of the reference face and the first area.

4. The spatial light modulator according to claim 1, wherein the reflection portion contains an effective reflection area that intersects to the normal line of the reference face at an intersecting angle of 3 degrees or less.

5. The spatial light modulator according to claim 4, wherein the reflection portion is provided so that the effective reflection area thereof occupies 70% or more of the overall area of the reflection portion.

6. The spatial light modulator according to claim 1, wherein the light shielding portion has a first light shielding portion whose longitudinal direction is coincident with a first direction substantially parallel to the reference face, and a second light shielding portion whose longitudinal direction is coincident with a second direction that is substantially parallel to the reference face and substantially perpendicular to the first direction, the first light shielding portion and the second light shielding portion are arranged so as to intersect each other at a cross portion, and the width in a direction substantially perpendicular to the longitudinal direction is set to be larger at the cross portion as compared with that at the other portions than the cross portion.

7. An image display device comprising:
   a light source portion for supplying light;
   a spatial light modulator for modulating the light from the light source portion in accordance with an image signal; and
   a projection optical system for projecting the light modulated by the spatial light modulator, wherein the spatial light modulator includes a modulator for modulating incident light in accordance with an image signal, and a optical path deflector that is provided in the neighborhood of the modulator and reflects the incident light to the modulator, wherein the modulator includes plural pixel portions arranged in a matrix form and a light shielding portion provided between the pixel portions, and the optical path deflector is a prism element having a reflection portion for reflecting the incident light to the pixel portions, the prism element being disposed at a position corresponding to the light shielding portion on a reference face, and the length of the prism element in a direction substantially perpendicular to the reference face being set in the range from 15 times to 250 times of the length of the prism element in a direction substantially parallel to the reference face.

8. The image display device according to claim 7, wherein when the f-number of the projection optical system is represented by F, the prism element emits incident light intersecting to the normal line of the reference face at a predetermined angle while converting the incident light to light having an angle $\theta o$ satisfying the following equation:

$$0 \leq \theta o \leq \arctan\{1/(2F)\}.$$

* * * * *